US012642155B2

(12) United States Patent
Billich

(10) Patent No.: US 12,642,155 B2
(45) Date of Patent: *Jun. 2, 2026

(54) ARRANGEMENT FOR CONTROLLING A HYDRAULIC THREE-POINT HITCH

(71) Applicant: DEERE & COMPANY, Moline, IL (US)

(72) Inventor: Manuel Billich, Dornstadt (DE)

(73) Assignee: DEERE & COMPANY, Moline, IL (US)

( * ) Notice: Subject to any disclaimer, the term of this patent is extended or adjusted under 35 U.S.C. 154(b) by 378 days.

This patent is subject to a terminal disclaimer.

(21) Appl. No.: 18/475,421

(22) Filed: Sep. 27, 2023

(65) Prior Publication Data

US 2024/0099174 A1     Mar. 28, 2024

(30) Foreign Application Priority Data

Sep. 28, 2022     (DE) ......................... 102022124970.0

(51) Int. Cl.
 *A01B 63/10* (2006.01)
 *A01B 59/041* (2006.01)
 *F15B 11/22* (2006.01)
(52) U.S. Cl.
 CPC ...... *A01B 63/1006* (2013.01); *A01B 59/0415* (2013.01); *F15B 11/22* (2013.01); *F15B 2211/50554* (2013.01)
(58) Field of Classification Search
 CPC ... A01B 63/1006; A01B 63/002; A01B 63/02; A01B 63/10; A01B 59/0415; F15B 11/22; F15B 11/08; F16K 11/163; F16K 31/047
 See application file for complete search history.

(56) References Cited

U.S. PATENT DOCUMENTS 6,250,396 B1 * 6/2001 Gengler ............. A01B 63/1006
                                              172/7
8,925,439 B2 * 1/2015 Greenwood ....... A01B 63/1006
                                              91/445

(Continued)

FOREIGN PATENT DOCUMENTS

CN      111802010 A    10/2020
EP      0348854 A2     1/1990
EP      1496009 A1     1/2005

OTHER PUBLICATIONS

European Search Report issued in Application No. 23196759.7, dated Feb. 21, 2024, 10 pages.

(Continued)

*Primary Examiner* — Joseph M Rocca
*Assistant Examiner* — Robert E Pezzuto

(57)     ABSTRACT

An arrangement for controlling a hydraulic three-point hitch includes a double-acting hydraulic cylinder and first and second seat valves. The double-acting hydraulic cylinder has a first working chamber, by which pressurized hydraulic fluid can change the lifting position of a lower arm of the hydraulic three-point hitch, and a second working chamber connected to a control valve arrangement, by which a specified target pressure can be set in the second working chamber. The first and second seat valves are in fluid communication with the working chamber. The first seat valve selectively produces a flow connection to a high-pressure source. The second seat valve selectively produces a return connection to a hydraulic reservoir.

12 Claims, 3 Drawing Sheets

(56) References Cited

U.S. PATENT DOCUMENTS

| 2004/0079224 | A1* | 4/2004 | Bernhardt | A01B 63/1006 |
| | | | | 91/525 |
| 2012/0205563 | A1 | 8/2012 | Rueb | |
| 2018/0209450 | A1 | 7/2018 | Hadersdorfer | |

OTHER PUBLICATIONS

European Search Report issued in Application No. 23196760.5, dated Feb. 21, 2024, 10 pages.

* cited by examiner

ARRANGEMENT FOR CONTROLLING A HYDRAULIC THREE-POINT HITCH

CROSS-REFERENCE TO RELATED APPLICATIONS

This application claims priority to German Patent Application No. 102022124969.7, filed Sep. 28, 2022, and German Patent Application No. 102022124970.0, filed Sep. 28, 2022, which are hereby incorporated by reference.

FIELD OF THE DISCLOSURE

The disclosure relates to an arrangement for controlling a hydraulic three-point hitch.

BACKGROUND

The use of hydraulic three-point hitches is a common measure, especially on agricultural tractors, for operating a wide variety of attachments and ground working implements.

SUMMARY

A three-point hitch, located in the rear or front region of the agricultural tractor, usually comprises left and right lower arms, which are articulated on a part of the chassis of the agricultural tractor in such a way that an attachment attached at associated coupling interfaces of the lower arms can be selectively raised and lowered by means of a hydraulic lifting mechanism. Apart from the two lower arms, also provided is a central upper arm, which serves for guiding the attachment during raising and lowering and can be hooked onto it by way of a further coupling interface. Here, the hydraulic lifting mechanism has at least one hydraulic cylinder, which can be used for pivoting left and right lever arms which are connected to one another for conjoint rotation by way of a rigid shaft and at the free ends of which the two lower arms are in turn articulated by way of respective lifting struts.

The actuation of the hydraulic cylinder takes place at the instigation of an electrically controllable valve arrangement, which has a first seat valve, fed with hydraulic fluid from a high-pressure pump, for pressurizing a working chamber of the hydraulic cylinder, and also a second seat valve, provided for relieving the pressure in the working chamber, the second seat valve opening out into a hydraulic reservoir. In other words, the first seat valve serves for raising, the second seat valve for lowering the lower arms of the three-point hitch.

Such an arrangement is known for example from EP 0 348 854 A1, this arrangement serving for activating a single-acting hydraulic cylinder. The use of a single-acting hydraulic cylinder has the consequence that the pressing pressure exerted on the ground by an attachment is primarily determined by its weight, so that in the case of certain agricultural applications, such as for example when digging or plowing, undesired variations of the ground working result can occur, depending on the soil conditions.

In view of this, the object of the present disclosure is to develop an arrangement for controlling a hydraulic three-point hitch of the type mentioned at the beginning with regard to achieving a consistent ground working result.

This object is achieved by an arrangement for controlling a hydraulic three-point hitch with the features of one or more embodiments described herein.

The arrangement for controlling a hydraulic three-point hitch comprises a hydraulic cylinder with a working chamber, to which pressurized hydraulic fluid can be admitted to change the lifting position of a lower arm comprised by the hydraulic three-point hitch, and also first and second seat valves communicating with the working chamber, the first seat valve being designed for producing a flow connection to a high-pressure source and the second seat valve being designed for producing a return connection to a hydraulic reservoir. Here, it involves a double-acting hydraulic cylinder with a further working chamber, which is connected to a control valve arrangement by means of which a specified target pressure can be set in the further working chamber.

By using a double-acting hydraulic cylinder and appropriately specifying the target pressure, it is possible to exert a downwardly acting force on the lower arm if the second seat valve is in its open position. This allows in certain agricultural applications, such as for example digging or plowing, the pressing pressure exerted by the attachment to be selectively increased if the weight of the attachment alone is not sufficient to achieve a desired ground working result. It is similarly conceivable to guide the attachment along a defined surface contour, and counteract an accompanying tendency of the attachment to "rise up", by suitably specifying or varying the target pressure. This is important for example when distributing crops in a flat silo or when clearing snow by means of a pusher blade.

Advantageous developments of the arrangement according to the disclosure can be found in one or more embodiments described herein.

According to a configuration of the control valve arrangement given by way of example, it may have a 3/2-way pilot valve with an outlet for providing an adjusting pressure corresponding to the specified target pressure, wherein, for providing the adjusting pressure corresponding to the specified target pressure, the 3/2-way pilot valve can be pushed by means of an electrical actuator into a first position, connecting the outlet to the high-pressure source, and, by feeding back the adjusting pressure or the working pressure induced in the further working chamber by way of a control input, can be pushed in the opposite valve actuating direction into a second position, connecting the outlet to the hydraulic reservoir. The activation of the electrical actuator takes place at the instigation of an actuator signal corresponding to the desired target pressure. If the double-acting hydraulic cylinder is intended to operate in a single-acting manner, on the other hand, the electrical actuator remains inactive. As a result, the further working chamber of the hydraulic cylinder is directly connected to the hydraulic reservoir. The same applies to the case where the first seat valve is open or both seat valves are closed, in order to prevent the hydraulic cylinder from being blocked or an uncontrolled pressure increase or build-up occurring in the further working chamber.

In one embodiment, the adjusting pressure provided at the outlet of the 3/2-way pilot valve can serve for directly pressurizing the further working chamber of the hydraulic cylinder. To achieve sufficiently high rates of movement of the hydraulic cylinder, it must allow correspondingly high through-flow rates, which ultimately leads to a valve construction with comparatively large dimensions and to an increased power output of the electrical actuator required for its actuation.

With a view to implementing the control valve arrangement in a way that is optimized in terms of cost and installation space, there is therefore the possibility of providing a 3/2-way main valve, which has a further outlet, communicating with the further working chamber of the hydraulic cylinder, wherein the 3/2-way main valve can be pushed by means of the adjusting pressure provided by the 3/2-way pilot valve by way of a first control input into a first position, connecting the further outlet to the high-pressure source, and, by feeding back the working pressure induced in the annular chamber by way of a second control input, can be pushed in the opposite valve actuating direction into a second position, connecting the further outlet to the hydraulic reservoir. In other words, the 3/2-way pilot valve equipped with the electrical actuator serves here for pre-controlling the 3/2-way main valve, and so this pilot valve does not have to meet any particular requirements with respect to the through-flow rates to be achieved. The 3/2-way pilot valve is therefore comparatively compact and inexpensive. The same applies to the 3/2-way main valve, since it is actuated by way of the two control inputs by purely hydraulic means.

The feedback of the adjusting pressure or the working pressure induced in the further working chamber has the effect of forming a control loop in which a target pressure corresponding to the respective actuator signal sets itself automatically. This dispenses with the need for complex active electrical pressure control.

To obtain bearing pressure control, it may also be provided that the control valve arrangement comprises a 4/2-way valve, by means of which the outlet of the 3/2-way pilot valve can be connected to the working chamber of the hydraulic cylinder instead of to the first control input of the 3/2-way main valve and at the same time the first control input of the 3/2-way main valve can be connected to the hydraulic reservoir instead of to the outlet of the 3/2-way pilot valve. For increasing the working pressure in the working chamber of the hydraulic cylinder, the bearing pressure that is exerted on the ground by means of an attachment attached to the three-point hitch can be selectively reduced, which is desired for example in the case of mowers and usually takes place at present by purely mechanical means, by means of corresponding spring arrangements or the like.

Furthermore, a pressure compensation valve can be connected upstream of each of the two seat valves with respect to its respective through-flow direction. In this way it is ensured that the volume flow of the hydraulic fluid passing through the seat valves, and consequently the rate of movement of the hydraulic cylinder, remains substantially constant and depends on the momentary actuating state of the relevant seat valve.

The pressure compensation valve is formed by a pressure control valve, which compares a hydraulic pressure acting on the seat valve on the outlet side with a hydraulic pressure acting on it on the inlet side and sets it to a fixed differential pressure. Here, the pressure compensation valve and the seat valve may be integrated in a common valve assembly.

The above and other features will become apparent from the following detailed description and accompanying drawings.

BRIEF DESCRIPTION OF THE DRAWINGS

The arrangement according to the disclosure for controlling a hydraulic three-point hitch is described in more detail below on the basis of the drawings. Here, identical reference signs relate to corresponding components or components which are comparable with respect to their function. In the drawings.

DETAILED DESCRIPTION

The embodiments or implementations disclosed in the above drawings and the following detailed description are not intended to be exhaustive or to limit the present disclosure to these embodiments or implementations.

Figure 1:
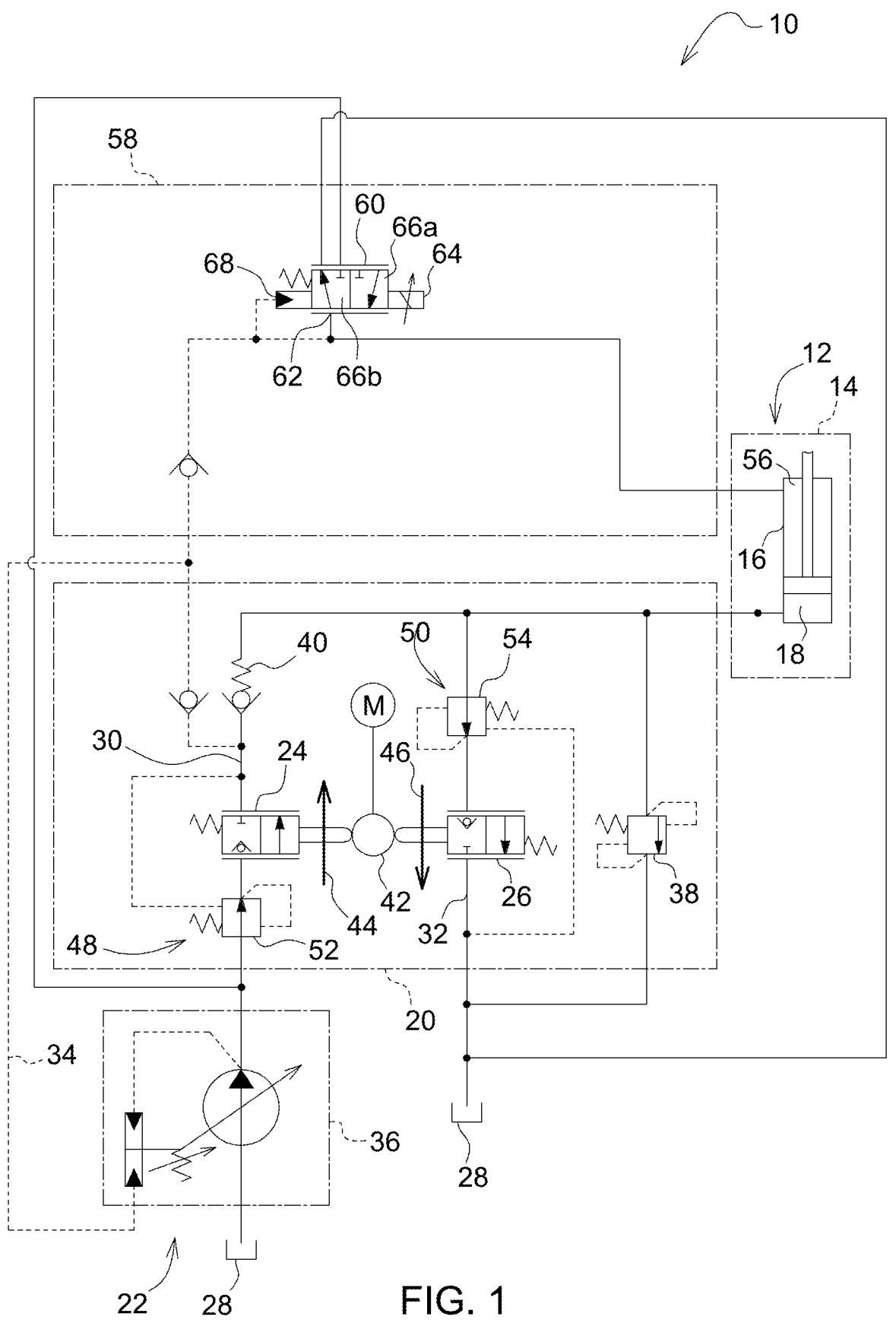
FIG. 1 shows a schematically illustrated example embodiment of the arrangement according to the disclosure for controlling a hydraulic three-point hitch.

FIG. 1 shows a schematically illustrated example embodiment of the arrangement 10 according to the disclosure for controlling a hydraulic three-point hitch 12.

The three-point hitch 12, not illustrated any more specifically, is of a conventional type of construction and comprises left and right lower arms, which are articulated on a part of the chassis of an agricultural tractor (not shown) in such a way that an attachment attached at associated coupling interfaces of the lower arms can be selectively raised and lowered by means of a hydraulic lifting mechanism 14. Apart from the two lower arms, also provided is a central upper arm, which serves for guiding the attachment during raising and lowering and can be hooked onto it by way of a further coupling interface. The three-point hitch 12 is located in the rear or front region of the agricultural tractor.

The hydraulic lifting mechanism 14 has left and right hydraulic cylinders 16, which can be used for pivoting left and right lever arms which are connected to one another for conjoint rotation by way of a rigid shaft and at the free ends of which the two lower arms are in turn articulated by way of respective lifting struts.

For reasons of overall clarity, one of the two hydraulic cylinders 16 is reproduced in FIG. 1, the cylinders respectively having a first working chamber 18 (so-called lifting chamber), to which pressurized hydraulic fluid can be admitted to change the lifting position of the lower arms.

The actuation of the hydraulic cylinders 16 takes place at the instigation of an electrically controllable valve arrangement 20, which has a first seat valve 24, fed with hydraulic fluid from a high-pressure source 22 of the agricultural tractor, for pressurizing the first working chambers 18, hydraulically connected in parallel, and also a second seat valve 26, provided for relieving the pressure in the first working chambers 18, the second seat valve 26 opening out into a hydraulic reservoir 28. Consequently, the first seat valve 24, communicating with the first working chambers 18, serves for raising the lower arms of the three-point hitch 12, by producing a flow connection 30 to the high-pressure source 22, the second seat valve 26, communicating with the first working chambers 18, serves for lowering these lower arms, by producing a return connection 32 to the hydraulic reservoir 28.

The high-pressure source 22 is in the present case a high-pressure pump 36, which is load-controlled by way of an associated sensor line 34 and is supplied with hydraulic fluid drawn in from the hydraulic reservoir 28. The necessary pressure relief of the sensor line 34 takes place conventionally by way of the high-pressure source 22 and is not illustrated any more specifically here.

To avoid overload-induced pressure peaks in the first working chambers 18 of the hydraulic cylinders 16 these chambers communicate with a pressure limiting valve 38, by means of which the two seat valves 24, 26 can be bridged in the direction of the hydraulic reservoir 28. If a pressure threshold value of the order of magnitude of typically 230 to 250 bar is exceeded, the pressure limiting valve 38 diverts the hydraulic fluid located in the piston chambers 18 in the direction of the hydraulic reservoir 28 until the pressure falls below the pressure threshold value. Also provided is a one-way valve 40, which is located in the flow connection 30 between the first seat valve 24 and the first working chambers 18 of the hydraulic cylinders 16. The one-way valve 40 eliminates the possibility of the lower arms suddenly dropping when the first seat valve 24 opens, as a result of a pressure deficit at the high-pressure source 22.

For activating the two seat valves 24, 26, an eccentric disk 42 driven by an electric motor is provided, by means of which one or the other of the two seat valves 24, 26, according to choice, can be pushed against a returning spring force into a respective open position.

As FIG. 1 also reveals, a pressure compensation valve 48, 50 is connected upstream of each of the two seat valves 24, 26 with respect to its respective through-flow direction 44, 46. In this way it is ensured that the volume flow of the hydraulic fluid passing through the seat valves 24, 26, and consequently the rate of movement of the hydraulic cylinders 16, remains substantially constant and depends on the momentary actuating state of the relevant seat valve 24, 26.

For example, each of the pressure compensation valves 48, 50 is formed by a pressure control valve 52, 54, which compares a hydraulic pressure acting on the relevant seat valve 24, 26 on the outlet side with a hydraulic pressure acting on it on the inlet side and sets it to a fixed differential pressure. Here, the pressure compensation valve 48, 50 and the seat valve 24, 26 may be integrated in a common valve assembly.

In the present case it is a double-acting hydraulic cylinder 16 with respective second working chambers 56 (so-called pressure chambers), which are hydraulically connected in parallel and are connected to a control valve arrangement 58, by means of which a specified target pressure can be set in the second working chambers 56. By appropriately specifying the target pressure, it is possible to exert a downwardly acting force on the two lower arms by means of the hydraulic cylinders 16 if the second seat valve 26 is in its open position. This allows in certain agricultural applications, such as for example digging or plowing, the pressing pressure exerted by the attachment to be selectively increased if the weight of the attachment alone is not sufficient to achieve a desired ground working result. It is similarly conceivable to guide the attachment along a defined surface contour, and counteract an accompanying tendency of the attachment to "rise up", by suitably specifying or varying the target pressure. This is important for example when distributing crops in a flat silo or when clearing snow by means of a pusher blade.

According to a configuration of the control valve arrangement 58 shown in FIG. 1, it has a 3/2-way pilot valve 60 with an outlet 62 for providing an adjusting pressure corresponding to the specified target pressure. For providing the adjusting pressure corresponding to the specified target pressure, the 3/2-way pilot valve 60 can be pushed by means of an electrical actuator 64 into a first position 66*a*, connecting the outlet 62 to the high-pressure source 22, and, by feeding back the adjusting pressure or the working pressure induced in the second working chambers 56 by way of a control input 68, can be pushed in the opposite valve actuating direction into a second position 66*b*, connecting the outlet 62 to the hydraulic reservoir 28. The activation of the electrical actuator 64 takes place at the instigation of an actuator signal corresponding to the desired target pressure. If the double-acting hydraulic cylinders 16 are intended to operate in a single-acting manner, on the other hand, the electrical actuator 64 remains inactive. As a result, the second working chambers 56 of the hydraulic cylinders 16 are directly connected to the hydraulic reservoir 28. The same applies to the case where the first seat valve 24 is open or both seat valves 24, 26 are closed, in order to prevent the hydraulic cylinders 16 from being blocked or an uncontrolled pressure increase or build-up from occurring in the second working chambers 56.

On the basis of FIG. 1, the adjusting pressure provided at the outlet 62 of the 3/2-way pilot valve 60 serves for directly pressurizing the second working chambers 56 of the hydraulic cylinders 16. To achieve sufficiently high rates of movement of the hydraulic cylinders 16, it must allow correspondingly high through-flow rates, which ultimately leads to a valve construction with comparatively large dimensions and to an increased power output of the electrical actuator 64 required for its actuation.

Figure 2:
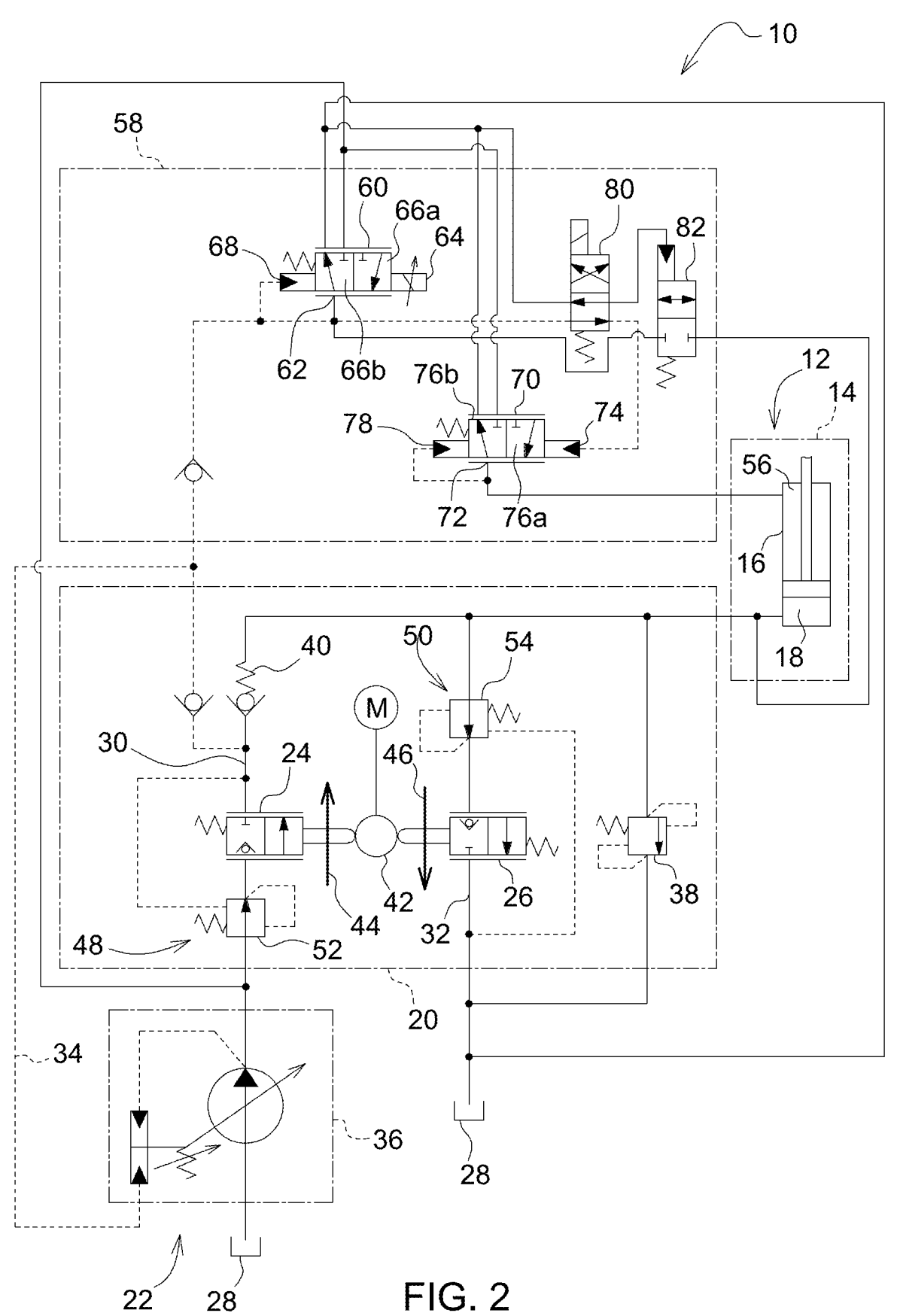
FIG. 2 shows a first variant of the example embodiment illustrated in FIG. 1.
Figure 3:
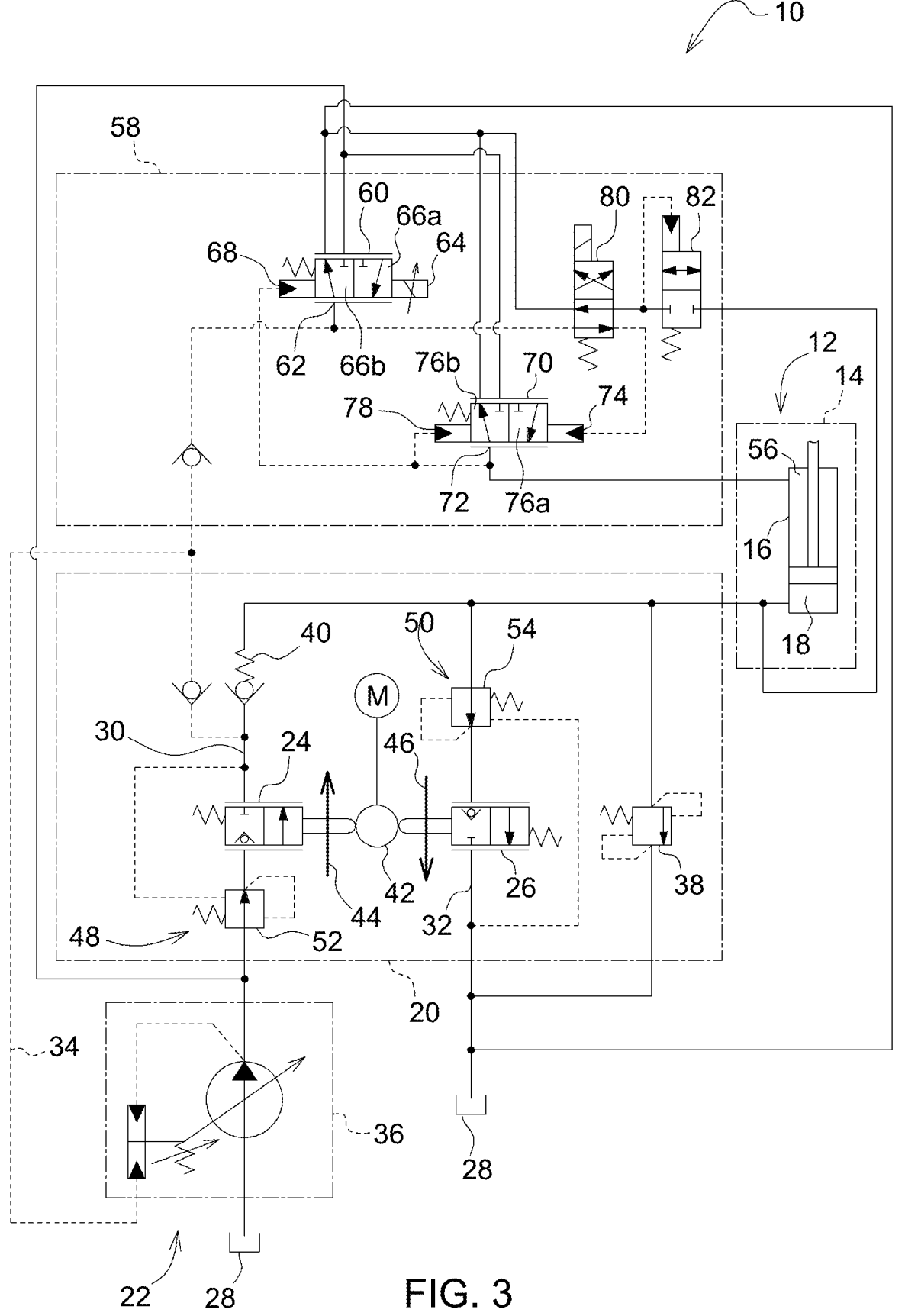
FIG. 3 shows a second variant of the example embodiment illustrated in FIG. 1.

Implementing the control valve arrangement 58 in a way that is optimized in terms of cost and installation space can be achieved within the framework of the two variants according to FIGS. 2 and 3. Additionally provided in each case is a 3/2-way main valve 70, which has a further outlet 72 communicating with the second working chambers 56 of the hydraulic cylinders 16, wherein the 3/2-way main valve 70 can be pushed by means of the adjusting pressure provided by the 3/2-way pilot valve 60 by way of a first control input 74 into a first position 76*a*, connecting the further outlet 72 to the high-pressure source 22, and, by feeding back the working pressure induced in the second working chambers 56 by way of a second control input 78, can be pushed in the opposite valve actuating direction into a second position 76*b*, connecting the further outlet 72 to the hydraulic reservoir 28. In other words, the 3/2-way pilot valve 60 equipped with the electrical actuator 64 serves here for pre-controlling the 3/2-way main valve 70, and so this pilot valve does not have to meet any particular requirements with respect to the through-flow rates to be achieved. The 3/2-way pilot valve 60 is therefore comparatively compact and inexpensive. The same applies to the 3/2-way main valve 70, since it is actuated by way of the two control inputs 74, 78 by purely hydraulic means.

As is evident, the variants differ with regard to the manner and means of the pressure feedback to the control input 68 of the 3/2-way pilot valve 60. According to FIG. 2, the adjusting pressure at the outlet 62 of the 3/2-way pilot valve 60 is fed back directly to its control input 68, whereas, according to FIG. 3, a feedback of the working pressure actually induced in the second working chambers 56 takes place.

The feedback of the adjusting pressure or the working pressure induced in the second working chamber 56 has the effect of forming a control loop in which a target pressure corresponding to the respective actuator signal sets itself automatically. This dispenses with the need for complex active electrical pressure control.

Furthermore, a bearing pressure control on the agricultural tractor 10 is obtained in connection with the two aforementioned variants. For this purpose, the control valve arrangement 58 comprises an electrically switchable 4/2-way valve 80, by means of which the outlet 62 of the 3/2-way pilot valve 60 can be connected to the first working chambers 18 of the hydraulic cylinders 16 instead of to the first control input 74 of the 3/2-way main valve 70 and at the same time the first control input 74 of the 3/2-way main valve 70 can be connected to the hydraulic reservoir 28 instead of to the outlet 62 of the 3/2-way pilot valve 60. The shut-off valve 82 in this case ensures that a connection of the second working chambers 56 of the hydraulic cylinders 16 in the direction of the hydraulic reservoir 28 is interrupted if the bearing pressure control is not active, which is the case here when the 4/2-way valve 80 is in its unactuated basic position. The shut-off valve 82 assumes its open position as soon as a connection to the outlet 62 of the 3/2-way pilot valve 60 is produced by way of the 4/2-way valve 80 and a certain minimum pressure is reached there, typically of 5 to 10 bar.

Various configurations are provided for the interconnection of the shut-off valve 82 with the 4/2-way valve 80. A first configuration, illustrated in FIG. 2, envisages connecting the outlet 62 of the 3/2-way pilot valve 60 directly to the shut-off valve 82. The 4/2-way valve 80 serves here for the actuation of the shut-off valve 82. According to a second configuration, reproduced in FIG. 3, the outlet 62 of the 3/2-way pilot valve 60 is likewise connected to the shut-off valve 82 by way of the 4/2-way valve 80. The first configuration leads to lower pressure losses as compared with the second, and allows a more compact construction of the 4/2-way valve 80. The above description should be understood here as given by way of example, in as much as both configurations can be used equally in conjunction with the first and second variants of the valve control arrangement 58.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An arrangement for controlling a hydraulic three-point hitch, comprising:
   a double-acting hydraulic cylinder with a first working chamber, by which pressurized hydraulic fluid can change the lifting position of a lower arm of the hydraulic three-point hitch, and a second working chamber connected to a control valve arrangement, by which a specified target pressure can be set in the second working chamber; and
   a first seat valve and a second seat valve in fluid communication with the working chamber, the first seat valve selectively producing a flow connection to a high-pressure source, and the second seat valve selectively producing a return connection to a hydraulic reservoir.

2. The arrangement of claim 1, wherein:
   the control valve arrangement has a 3/2-way pilot valve with an outlet;
   the 3/2-way pilot valve has first position connecting the outlet to the high-pressure source, the 3/2-way pilot valve can be moved into the first position via an electrical actuator; and
   the 3/2-way pilot valve has a second position connecting the outlet to the hydraulic reservoir, the 3/2-way pilot valve can be moved into the second position via a control input.

3. The arrangement of claim 2, wherein the outlet of the 3/2-way pilot valve in the first position directly pressurizes the second working chamber of the hydraulic cylinder.

4. The arrangement of claim 2, further comprising:
   a 3/2-way main valve having a second outlet communicating with the second working chamber of the hydraulic cylinder, the 3/2-way main valve having a first position connecting the second outlet to the high-pressure source, the 3/2-way main valve being moved into the first position via a second control input, the 3/2-way main valve having a second position connecting the second outlet to the hydraulic reservoir, the 3/2-way main valve being moved into the second position via a third control input.

5. The arrangement of claim 4, wherein the control valve arrangement comprises a 4/2-way valve, which can connect the outlet of the 3/2-way pilot valve to the first working chamber of the hydraulic cylinder instead of to the second control input of the 3/2-way main valve and at the same time can connect the second control input of the 3/2-way main valve to the hydraulic reservoir instead of to the outlet of the 3/2-way pilot valve.

6. The arrangement of claim 1, further comprising:
   a first pressure compensation valve connected upstream of the first seat valve in a first through-flow direction; and
   a second pressure compensation valve connected upstream of the second seat valve in a second through-flow direction.

7. An agricultural tractor including an arrangement for controlling a hydraulic three-point hitch, comprising:

a double-acting hydraulic cylinder with a first working
chamber, by which pressurized hydraulic fluid can
change the lifting position of a lower arm of the
hydraulic three-point hitch, and a second working
chamber connected to a control valve arrangement, by
which a specified target pressure can be set in the
second working chamber; and a first seat valve and a second seat valve in fluid com-
munication with the working chamber, the first seat
valve selectively producing a flow connection to a
high-pressure source, and the second seat valve selec-
tively producing a return connection to a hydraulic
reservoir.

8. The agricultural tractor of claim 7, wherein:

the control valve arrangement has a 3/2-way pilot valve
with an outlet;

the 3/2-way pilot valve has first position connecting the
outlet to the high-pressure source, the 3/2-way pilot
valve can be moved into the first position via an
electrical actuator; and the 3/2-way pilot valve has a second position connecting
the outlet to the hydraulic reservoir, the 3/2-way pilot
valve can be moved into the second position via a
control input.

9. The agricultural tractor of claim 8, wherein the outlet
of the 3/2-way pilot valve in the first position directly
pressurizes the second working chamber of the hydraulic
cylinder.

10

10. The agricultural tractor of claim 8, further comprising:

a 3/2-way main valve having a second outlet communi-
cating with the second working chamber of the hydrau-
lic cylinder, the 3/2-way main valve having a first
position connecting the second outlet to the high-
pressure source, the 3/2-way main valve being moved
into the first position via a second control input, the
3/2-way main valve having a second position connect-
ing the second outlet to the hydraulic reservoir, the
3/2-way main valve being moved into the second
position via a third control input.

11. The agricultural tractor of claim 10, wherein the
control valve arrangement comprises a 4/2-way valve,
which can connect the outlet of the 3/2-way pilot valve to the
first working chamber of the hydraulic cylinder instead of to
the second control input of the 3/2-way main valve and at the
same time can connect the second control input of the
3/2-way main valve to the hydraulic reservoir instead of to
the outlet of the 3/2-way pilot valve.

12. The agricultural tractor of claim 7, further comprising:

a first pressure compensation valve connected upstream of
the first seat valve in a first through-flow direction; and a second pressure compensation valve connected
upstream of the second seat valve in a second through-
flow direction.

* * * * *